(12) United States Patent
Watkins et al.

(10) Patent No.: US 7,581,229 B2
(45) Date of Patent: Aug. 25, 2009

(54) SYSTEMS AND METHODS FOR SUPPORTING DEVICE ACCESS FROM MULTIPLE OPERATING SYSTEMS

(75) Inventors: Douglas A. Watkins, Bellevue, WA (US); Andrew Ernest Nicholas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 11/078,065

(22) Filed: Mar. 11, 2005

(65) Prior Publication Data

US 2006/0206904 A1  Sep. 14, 2006

(51) Int. Cl.
*G06F 9/44* (2006.01)
*G06F 9/455* (2006.01)

(52) U.S. Cl. .............................. 719/321; 718/1; 703/23; 703/27

(58) Field of Classification Search ................. 719/310, 719/319–321, 330; 718/1; 703/23, 27; 709/223, 709/224
See application file for complete search history.

(56) References Cited

U.S. PATENT DOCUMENTS

| | | | | |
|---|---|---|---|---|
| 5,367,661 A | * | 11/1994 | Hough et al. | 703/27 |
| 5,964,843 A | * | 10/1999 | Eisler et al. | 719/323 |
| 6,269,409 B1 | * | 7/2001 | Solomon | 719/329 |
| 6,466,996 B1 | * | 10/2002 | Bonola | 710/36 |
| 6,944,699 B1 | * | 9/2005 | Bugnion et al. | 710/269 |
| 7,085,705 B2 | * | 8/2006 | Traut | 703/23 |
| 7,158,927 B2 | * | 1/2007 | Traut | 703/23 |
| 7,225,119 B2 | * | 5/2007 | Traut | 703/23 |
| 7,275,028 B2 | * | 9/2007 | Traut | 703/23 |
| 2004/0098473 A1 | * | 5/2004 | Yodaiken | 709/223 |
| 2004/0260809 A1 | * | 12/2004 | Yodaiken | 709/224 |
| 2005/0039180 A1 | * | 2/2005 | Fultheim et al. | 718/1 |

* cited by examiner

*Primary Examiner*—Van H Nguyen
(74) *Attorney, Agent, or Firm*—Woodcock Washburn LLP

(57) ABSTRACT

A host operating system can take ownership of a device. The host can project the presence of a device proxy (VDP) into a guest operating system. The VDP provides a set of device functions corresponding to the particular device class. Interactions with the VDP in the guest are forwarded to a Virtual Service Provider (VSP) in the host. The VSP maps a set of device class functions onto physical devices through a hardware abstraction and emulation layer. Functions supported directly by a physical device can be delivered to the device by the hardware abstraction layer (HAL). Functions not directly supported can be implemented through the hardware emulation layer (HEL). A uniform and robust set of functions may be made available in the guest regardless of hardware changes in the host, migration to a new host, or use of the device by other competing operating systems.

20 Claims, 9 Drawing Sheets

SYSTEMS AND METHODS FOR SUPPORTING DEVICE ACCESS FROM MULTIPLE OPERATING SYSTEMS

FIELD OF THE INVENTION

This invention relates to computing, and more particularly to sharing hardware devices by multiple operating systems.

BACKGROUND OF THE INVENTION

Computers include general purpose central processing units (CPUs) that execute a specific set of system instructions. A group of processors that have similar architecture or design specifications are referred to as a processor family. Examples of processor families are the MOTOROLA® 680X0 family, manufactured by Motorola, Inc. of Phoenix, Ariz.; the INTEL® 80X86 family, manufactured by INTEL® Corporation of Sunnyvale, Calif.; and the POWERPC® family, manufactured by Motorola, Inc. and used in computers manufactured by APPLE COMPUTER®, Inc. of Cupertino, Calif. Although a group of processors may be in the same family because of their similar architecture, processors may vary widely, even within a family, according to their clock speed and other performance parameters.

Each microprocessor family executes instructions that are unique to the processor family. The collective set of instructions that a processor can execute is known as the processor's instruction set. For example, the instruction set used by the INTEL® 80X86 processor family is incompatible with the instruction set used by the POWERPC® processor family. The INTEL® 80X86 instruction set is based on the Complex Instruction Set Computer (CISC) format. The MOTOROLA POWERPC® instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a higher rate.

The uniqueness of the processor family among computer systems also typically results in tailoring of software, such as operating system software, for a particular processor or processor family. Furthermore, other hardware elements of computer systems may be tailored for a particular processor or processor family. For example, a computer system manufactured with a processor from the INTEL® 80X86 processor family will have a hardware architecture that is different from the hardware architecture of a computer system manufactured with a processor from the POWERPC® processor family. An operating system designed for use with the INTEL® 80X86 processor and corresponding hardware may not function on a computer with the POWERPC® processor and corresponding hardware. Because of the uniqueness of the processor instruction set, hardware architecture, and operating system, application software programs are typically written to run on a particular computer system platform running a particular operating system.

A computer manufacturer will want to maximize its functionality by having more rather than fewer applications run on the microprocessor family associated with the computer manufacturer's product line. Likewise, software engineers benefit from wide usability of their software regardless of platform. To expand the number of operating systems and application programs that can run on a computer system, a field of technology has developed in which a given computer having a first operating system adapted for the particular system hardware, called a host, will run an emulator program that receives and executes instructions intended for some other system hardware configuration. Software, such as a second operating system, that is designed for the other system hardware configuration can then execute via the emulator program. Such an operating system is referred to as a guest operating system. Thus, the host will execute an application that will cause one or more host instructions to be called in response to a given guest instruction.

In some cases, the host can both run software designed for its own hardware architecture, other than the emulation program, and software written for computers having an unrelated hardware architecture. As a more specific example, a computer system manufactured by APPLE COMPUTER®, for example, may run operating systems and programs written for PC-based computer systems. It may also be possible to use an emulator program to concurrently operate multiple operating systems designed for different processor families on a single CPU. In this arrangement, although some operating systems may not be natively compatible with the system hardware, an emulator program can host one or more operating systems, allowing the otherwise incompatible operating systems to run concurrently on the same computer system.

When a computer system other than the native system is emulated by a host operating system, a guest operating system that executes via the emulated hardware is sometimes referred to as a virtual machine, as the guest operating system is insulated from the actual hardware architecture of the native computer system. Thus a virtual machine can comprise a guest operating system that executes via emulated hardware. As an example, the VIRTUAL PC® software marketed by MICROSOFT® Corp. of Redmond, Wash. emulates an entire computer that includes an INTEL® 80X86 Pentium processor and various motherboard components and cards. The operation of these components is emulated for the use of a virtual machine that is being supported by the host operating system which controls the native computer system.

An emulator program executing on the host operating system software and hardware architecture, such as a computer system having a POWERPC® processor, can mimic the operation of an entire computer system. The emulator program acts as the interchange between the hardware architecture of the host machine and the instructions transmitted by software running within the emulated environment. Thus, when a virtual machine is running, there are effectively two operating systems that share the host system hardware: the host operating system, and the guest operating system.

One advantage of a virtual machine over a real machine is the ability to quickly and cheaply create multiple instances of virtual machines. If allowed by the virtual machine implementation, multiple virtual machines can exist simultaneously in a single host machine (host computer system) environment. Resources of the host machine can be divided among the various virtual machines. For example, a single host machine with four processors and one gigabyte of random access memory (RAM) could be divided evenly into four virtual machines, each of which is given one processor and 256 megabytes of RAM. Other resource allocation divisions are possible.

This flexible resource allocation becomes even more useful when combined with the ability to move virtual machines from one host machine to another. This allows for "load balancing" of systems. For example, if a virtual machine requires more processing power than is available on one host machine, it can be moved to another host machine that has extra capacity.

Like the host computer system, the guest computer system can control, communicate with, and receive commands from hardware devices that are electronically coupled to the host system. Representing device functionality inside virtual machines is often accomplished by emulating a hardware device in software. Host-side emulation maps the features of emulated devices in a guest onto features supported by the physical devices in a host. While proper device emulation can deliver a high degree of compatibility, emulated devices often suffer from poor performance and their functionality is not easily extended. Modifications that deviate from the implementation of the original physical device often erode compatibility. Emulated hardware implementations are often unable to take advantage of increasing host-side hardware capabilities.

Furthermore, when a device fails, and a redundant device is waiting in reserve, the host computer system may be able to take advantage of the reserve device while the guest cannot, because, while the functions of the original device were emulated in the guest and mapped to corresponding features of the physical device, the functions of the reserve device may be somewhat different. Likewise, the host computer may support "hot swapping" of devices, such as by using the Advanced Configuration and Power Interface (ACPI) or Standard Hot Plug Configuration (SHPC) PCI standards, while the guest computer system may not. When one device is swapped for another, the guest may no longer be able to use the device.

Migration of a virtual machine can be problematic if the hardware in the destination host does not closely match the source host hardware. Virtual machines, whether in saved state or during a live migration, may contain instantiated device stacks for the specific devices projected by the originating host. When these stacks are transferred to a new host with different hardware, the stack instructions fail.

Device conflicts between the various machines attempting to use a particular device may also occur. Operating system device managing architectures are built with the assumption that there is a single instance of the system and that instance is the mediator of all entities accessing the device. This is not the case in a virtual machine environment when a physical device is shared across multiple operating systems. Conflicts arise between multiple operating systems that assume exclusive ownership of a device.

In view of the foregoing difficulties in sharing devices among multiple operating systems in a virtual machine arrangement, there is a need in the industry to improve present techniques for such sharing.

SUMMARY OF THE INVENTION

In consideration of the above-identified shortcomings of the art, the present invention provides systems and methods for supporting device access from multiple operating systems. A first operating system, e.g., a host, can take ownership of a device. The host can project the presence of a synthetic device, referred to here as a proxy driver or virtual device proxy (VDP), into a second operating system, e.g., a guest. The VDP provides a set of device functions corresponding to the particular device class, which may be independent of the actual functions of the same class of physical devices in the host. Interactions with the VDP in the second operating system are forwarded to a Virtual Service Provider (VSP) in the first operating system. The VSP maps a set of device class functions onto physical devices through a hardware abstraction and emulation layer. Functions supported by a physical device can be mapped as directly as possible through the hardware abstraction layer (HAL). Functions not supported by a physical device can be implemented through the hardware emulation layer (HEL). The range of device functions is easily extended to include new functions by extending the HEL. Since the VDP directly reflects the functions projected by the VSP, no update to the VDP is required when the functions available from a device are extended. A uniform and robust set of functions may be made available in the second operating system regardless of hardware changes in the first operating system, migration to a new host, or use of the device by other competing operating systems. Additional aspects of the invention are detailed below.

BRIEF DESCRIPTION OF THE DRAWINGS

The systems and methods for supporting device access by multiple operating systems in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Exemplary Computing Arrangement

Figure 1:
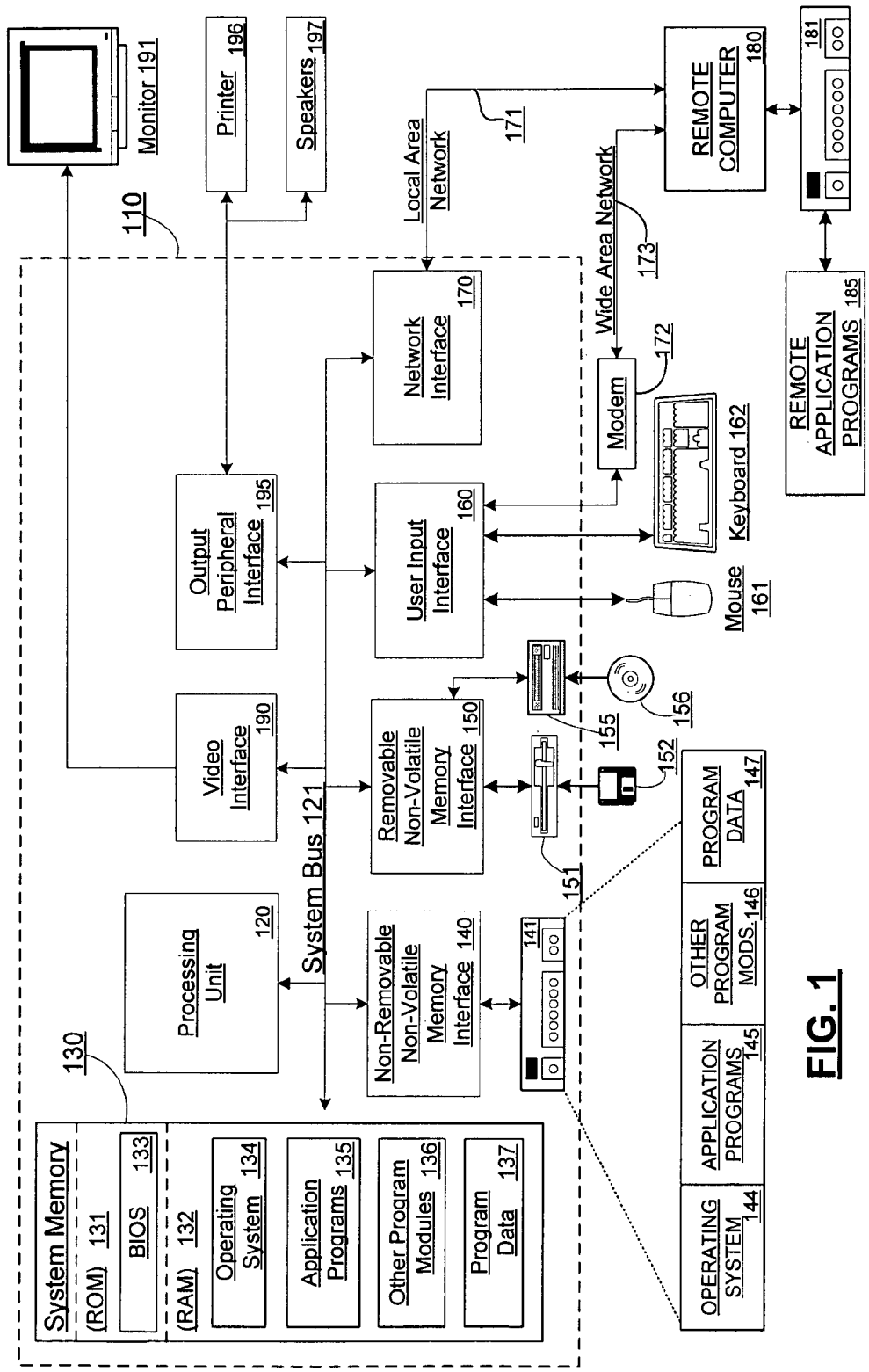
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile, nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

It is known in the art that two or more operating systems can execute side-by-side on a single computing device. In a typical virtual machine arrangement, the two operating systems may comprise a host and a guest. A third, fourth, fifth, or any additional number of operating systems may also execute as guest operating systems. Embodiments of the invention described herein contemplate a host operating system that provides hardware device services to one or more guest operating systems. While the host may be natively compatible with the system hardware while the guest is not, a host can just as well emulate the hardware of any computer system, including the very hardware which the host itself is designed for. Also, just as a host can emulate a computer, a guest can also emulate a second computer. Therefore the techniques described herein may be used in the context of interaction between guests, hosts, or any combination thereof. To emphasize this, the terms "first operating system" and "second operating system" are used in the summary of the invention section herein, the figures, and the claims. However, for convenience and clarity of description, the terms "host" and "guest" will generally be used otherwise.

Figure 2:
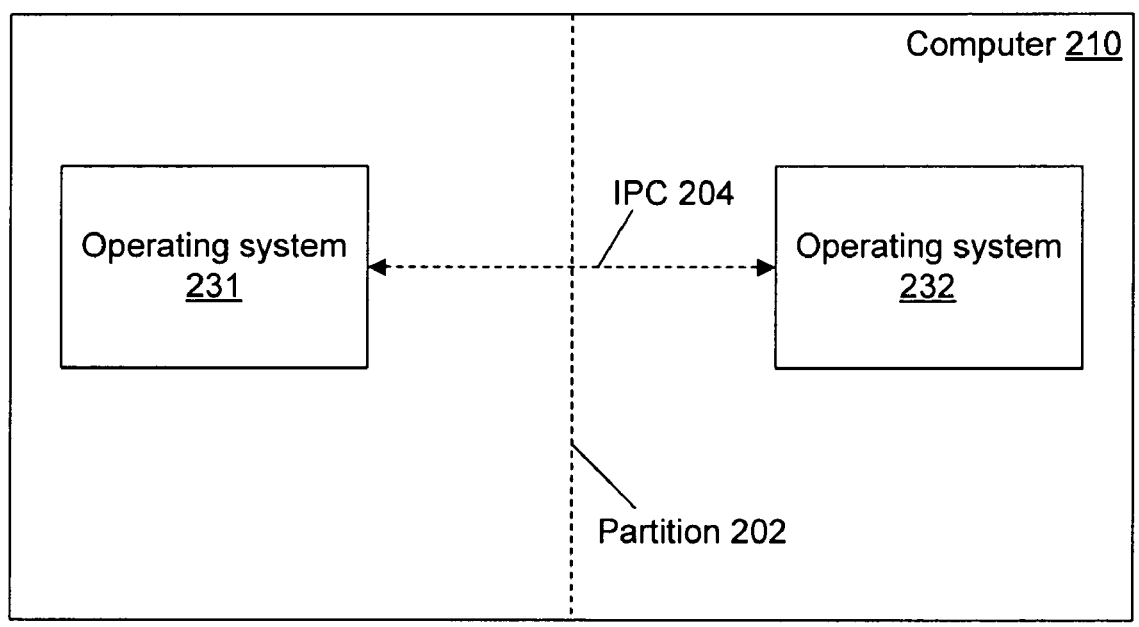
FIG. 2 is a block diagram of two exemplary execution environments that maintain some interaction with each other and some separation from each other in what may be referred to as a virtual machine arrangement.

This host/guest(s) arrangement allows the host and guest (s) to execute independently. However, it is occasionally desirable to provide some interaction between operating systems. FIG. 2 shows a system in which two operating systems 231 and 232 execute on a single computer 210. Some type of logical separation exists between operating systems 231 and 232, such that a certain amount of interaction is permitted between operating systems 231 and 232, while still allowing at least one of the operating systems to be protected against events that originate in the other operating system.

The separation is typically reflected by a partition 202. The term partition, as used herein, refers to a virtualization boundary between a host 231 and a guest 232. It should be noted that this definition is different from the generally accepted use of the term. "Partition" typically refers to a hard disk partition. Where a disk partition is referred to here, it will always be preceded by the term "disk." When not preceded by the term "disk," a partition is a virtualization boundary.

In contrast, a disk partition is a logical division of a hard disk created so that a computer can have different operating systems on the same hard disk or to create the appearance of having separate hard drives for file management, multiple users, or other purposes. A disk partition is typically created when a hard disk is formatted. Typically, a one-disk partition hard drive is labeled the "C:" drive ("A:" and "B:" are typically reserved for diskette drives). A two-disk partition hard drive would typically be referred to as the "C:" and "D:" drives.

The interaction between the operating systems 231, 232 may be accomplished through inter-process communication (IPC) 204. IPC 204 may comprise a set of programming interfaces that allow program processes, such as those of 231 and those of 232, to coordinate their activities. A set of IPC interfaces make this possible. IPC methods comprise pipes and named pipes; message queueing; semaphores; shared memory; and sockets. Each IPC method has its own advantages and limitations. Any IPC 204 techniques presently used in the art or later developed may be used in conjunction with the other various techniques disclosed here.

The interaction between operating systems 231 and 232 may be monitored by a security monitor. A security monitor is typically a component external to operating systems 231 and 232 which provides some security services that may be used to protect operating system 232 from operating system 231. For example, a security monitor may control access to certain hardware, may manage the use of memory (to give operating system 232 exclusive use of some portions of memory), or may facilitate the communication of data from operating system 231 to operating system 232 in a secure way. It should be noted that the use of a security monitor represents one model of how operating system 232 can be protected from operating system 231 although the use of a security monitor is not required. As another example, operating system 232 could include all of the functionality necessary to protect itself from operating system 231.

It should be noted that the parameters of what makes an operating system a "host" or a "guest" are flexible. In the examples that follow, we shall generally refer to operating system 231 as the "host" and operating system 232 as the "guest" for the purpose of distinguishing between them. It should be appreciated that the techniques described herein can be applied to the interaction of any two or more operating systems running on the same machine or on the same set of connected machines. Certain other techniques may be implemented to allow operating systems 231, 232 to exist side-by-side. The invention may be implemented in the context of any and all of the various virtualization architectures known in the art or as they are developed with the progress of virtual machine technologies.

Representation of a Physical Device in a Virtual Machine

Figure 3:
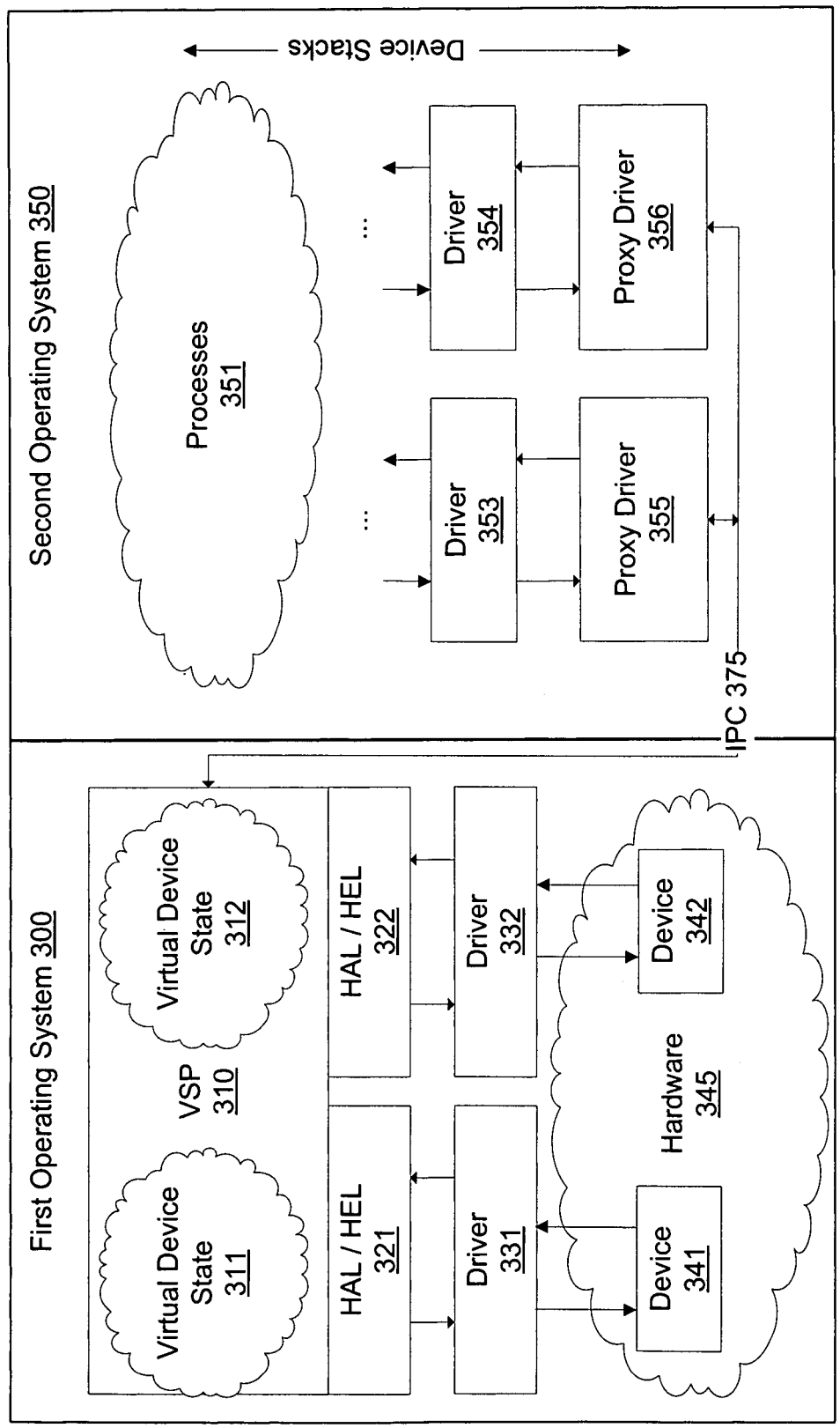
FIG. 3 illustrates two operating systems arranged so that the host 300 can manage device 341 access on behalf of the guest 350. A VDP 355 represents a set of functions to the guest 350. On receiving device function requests from the VDP, the VSP 310 can maintain a device state on behalf of the guest 350, as well as manage the performance of the requested functions through the HAL/HEL layer 321 as necessary.

FIG. 3 illustrates two operating systems 300, 350 arranged so that the host 300 can manage device 341, 342 access on behalf of the guest 350. In accordance with the techniques provided here, instead of emulating an actual device, e.g., 342, in software, the host 300 projects the presence of a synthetic device in the guest 350 via a proxy driver, e.g., 356. Proxy drivers 355, 356 may be referred to alternately as virtual device proxies (VDPs). To a guest 350, a VDP 356 may appear to be a physical device. However, the device function requests are mapped to VSP 310, rather than mapping such requests to emulated hardware.

Two devices 341, 342 are represented in FIG. 3 to guest 350 via two VDPs 355, 356. respectively. The illustration of the operation of the invention in the context of two devices 341, 342 projected to a guest 350 is simply to emphasize that the systems and methods herein may be easily scaled to any number of devices. When multiple devices 341, 342 are projected to a guest 350, multiple VDPs 355, 356 may be used to represent the devices 341, 341. Multiple device drivers, e.g., 352 and 354, may exist on the guests 350 to issue function requests to the VDPs 355, 356. Such drivers may ultimately respond to instructions generated by processes 351 running in guest 350. A VSP 310 may maintain multiple device states 311, 312, one for each VDP 355, 356 that is projected to the guest 350. The VSP 310 may communicate with an appropriate HAL/HEL layer 321, 322, which may vary for each device 341, 342. Finally, a plurality of device stacks, including drivers 331, 332, may exist on the host 300 for distilling device instructions into device operations. Hardware 345 is illustrated in host 300 to demonstrate that the host 300 will typically have primary control of a computer's hardware resources, such as the processor, memory, devices 341 and 242, display, and so forth.

Note that while there may be a one-to-one relationship between devices 341, 342 and drivers 355, 356, as illustrated in FIG. 3 and as described above, this arrangement is not necessary. The flexibility provided by the systems and methods here allow easy adaptation to support one-to-many relationships as well. For example, proxy devices 355, 356 may both be projected into guest 350 while only device 341, and not device 342, is present in the host 300. Conversely, a single proxy 355 (and not 356) might be projected into guest 350, and correspond to functions of multiple devices 341, 342 in the host 300.

Devices 341 and 342 may be "physical" devices such as displays, printers, keyboards, lights, video cameras, kitchen appliances, industrial equipment, and the like, noting however that physical devices that incorporate software-based functions are increasingly common. Thus, the term "device" as used here refers to any component capable of carrying out a function or set of functions, whether such component is primarily "physical," incorporates some software, or is entirely composed of software components.

The host 300 can, in some embodiments, project a proxy driver 356 into the guest 350 by exposing the proxy driver, e.g., 356, across an IPC 375 interface. The proxy driver 356 represents a set of device functions for a particular device class. The represented functions can be independent of the functions of the same class of physical devices in the host 300. For example, if device 342 is a graphics card, the proxy driver 356 can represent a set of graphics functions, e.g., a <display burning fire> function, a <display billowing smoke> function, a <display running water> function, a <display a triangle> function, and a <set color of triangle> function. In some embodiments, these functions may be represented to the guest 350 even though a corresponding physical device 342 does not actually directly support them. Conversely, the device 342 may directly support additional functions beyond those represented to the guest 350.

The functions represented by a proxy driver 355, 356 can be accessed by the guest 350 according to standard device access methods. That is, a plurality of software layers may cooperate to reduce high-level instructions from guest 350 and guest applications down to actual electronic signals that are intended to operate a particular device. Unbeknownst to guest 350 and guest processes 351, the "device" that is operated by its device drivers, 352 and 354, is actually a proxy driver 355 or 356.

Thus, in FIG. 3, two proxy drivers 355 and 356 are represented in the guest 350. Each proxy driver 355, 356, and any other proxy devices that may be represented to the guest 350, receive function requests in some electronic form from the drivers 353, 354, respectively, which in turn may receive the function requests, albeit in some higher-level format, from any higher level guest drivers, such as filter drivers, ultimately responding to the instructions of one or more top-level processes 351.

Function requests received by proxy drivers 355, 356 may be delivered to a Virtual Service Provider (VSP) 310. A VSP 310 comprises software for managing the operations of one or more devices 341, 342. In one embodiment, a VSP 310 can execute on a host 300 that is said to have "ownership" of one or more devices 311, 312. Ownership simply means that host 300 can control the operations of devices 341, 342 without being subject to the intervention of other independent operating systems. In other embodiments, however, there may in fact be additional operating systems between "host" 300 and devices 341, 342. A multi-tiered solution might be envisioned in which the "devices" 341, 342 are actually proxy drivers that relay function requests to yet another operating system. For the purposes of this description, however, host 300 can directly control physical devices 341, 342 through the host's 300 drivers 331, 332.

The VSP 310 may serve a variety of purposes. The purposes are outlined here, bearing in mind that functions provided by a VSP 310 may be moved to one or more of the other components of a computer system, such as the HAL/HEL layer 322, the VDP 356, or to some other component that works in cooperation with the VSP 310.

A first function provided by the VSP 310 can be the projection of the VDP 356 into guest 350. A determination of what device functions to project in the VDP 356 can be made in the VSP 310. This determination can be made based on the actual capabilities of a device 342, as well as any device functions that can be emulated in software by the HEL 322. For example, if a graphics card 342 can directly carry out the drawing of a triangle and coloring of a triangle, then these functions are good candidates for VSP 310 to include in the set of functions projected to the guest 350.

Additionally, the HEL portion of 322 may be able to emulate the effect of billowing smoke, although this function may not be directly supported by the device 342. The effect of billowing smoke may be emulated, for example, by software that instructs device 342 to successively draw hundreds of small grey triangles to create the look of billowing smoke.

As a result, the VSP 310 may determine that billowing smoke can be represented in the VDP 356 as an available device function. Thus, in summary for this example, VSP 310 may project a set of functions including draw a triangle, color a triangle, and draw billowing smoke to the guest 350. This is of course a simplified example and the actual set of functions represented to guest 350 will be somewhat larger. The important point is that a function of the VSP 310 can be to determine a set of functions to represent in the VDP 356, and that the determined function set need not be related to the functions directly supported by a device 342. Instead, additional functions can be represented. These additional functions may be those supported in software, as determined from the HAL/HEL layer 322, or those supported elsewhere, or indeed functions that are not supported at all. Conversely, a set of functions that are less than the directly supported device 342 function set may be determined by the VSP 310 to be an appropriate function set to represent to the guest 350.

A next function of the VSP 310 may be to maintain a device state 312 on behalf of the second operating system 350. The VSP 310 can isolate a device state 312 on behalf of a proxy driver, e.g., 356. This device state 312 might be queried by a device driver 352 in the guest 350 to determine the status of requested device functions, to determine whether to time-out, to give a user device information, and so forth. The device state 312 maintained by the VSP 310 need not be, and in many embodiments is not, the actual physical device 342 state. Instead, it is an artificial device state 312 that provides the guest 350 with what the guest 350 needs to know. For instance, the guest 350 may not need to know information about other operating systems' usage of a device 342.

In this regard, the virtual device state 312 may be tailored by the VSP 310 to include artificial device state information. Thus, if a device 342 fails, but a backup device is available, the failure need not be represented in the device state 312. Instead, VSP 310 can manage the switch to a backup device, all the while representing to guest 350 via proxy device 356 that its device is in the state of executing a function request. The use of an artificial device state 312 will be discussed further below in connection with device failover, device hotswapping, and with managing device access by multiple guests.

A third function of the VSP may be to strike a HAL/HEL balance. This function may be moved to the HAL/HEL layer 322 itself in many embodiments. Striking a HAL/HEL balance is a matter of determining which function requests can be sent directly to a device, and which require substantial additional software operations. Function requests that are directly supported by a device, e.g., 342 can be mapped as directly as possible to the device 342 through the hardware abstraction layer (HAL). Thus, where drawing and coloring triangles are directly supported by a graphics card 342, function requests for such operations may be sent directly to the card 342 to be carried out in a highly efficient manner.

Capabilities not supported by a device 342 may be implemented through the hardware emulation layer (HEL). The HAL and HEL are illustrated as a single component 322 in the figures, but there are some differences between the HAL and the HEL. The HEL satisfies function requests by either completely performing a function using software, or by piecing together available device 342 functions to effectively achieve the desired result. For example, if a request for billowing smoke is made, and a graphics card 342 does not directly support such an effect, then the request may be sent to the HEL, which may attempt to produce the effect of billowing smoke by drawing a multitude of small grey triangles.

Thus, some device function requests may be satisfied by sending the request more or less directly to a device 342 through the HAL, while other device function requests need to be emulated via the HEL. A function of the VSP 310 can be to strike a HAL/HEL 322 balance for the particular device 342 that is available. If a device 342 has many advanced features, then the HAL/HEL 322 balance may shepard requests almost exclusively to the HAL. If the device is very basic and does not directly support many functions, then the HAL/HEL 322 balance may direct more function requests to the HEL.

One advantage of the invention is that the set of available device functions represented to guest 350 can be easily extended by supporting additional functions in the HEL. Since the proxy driver 356 can directly reflect the function set projected by the VSP 310, no update to the proxy driver 356 is required when the functionality of the device 342 is effectively extended via additions to the HEL 322. Because a uniform and robust set of functions can be made available in the guest 350, the use of a broader range of physical device 341, 342 features may become increasingly likely to be leveraged by the guest 350, thereby promoting advancement of hardware capabilities.

Figure 4:
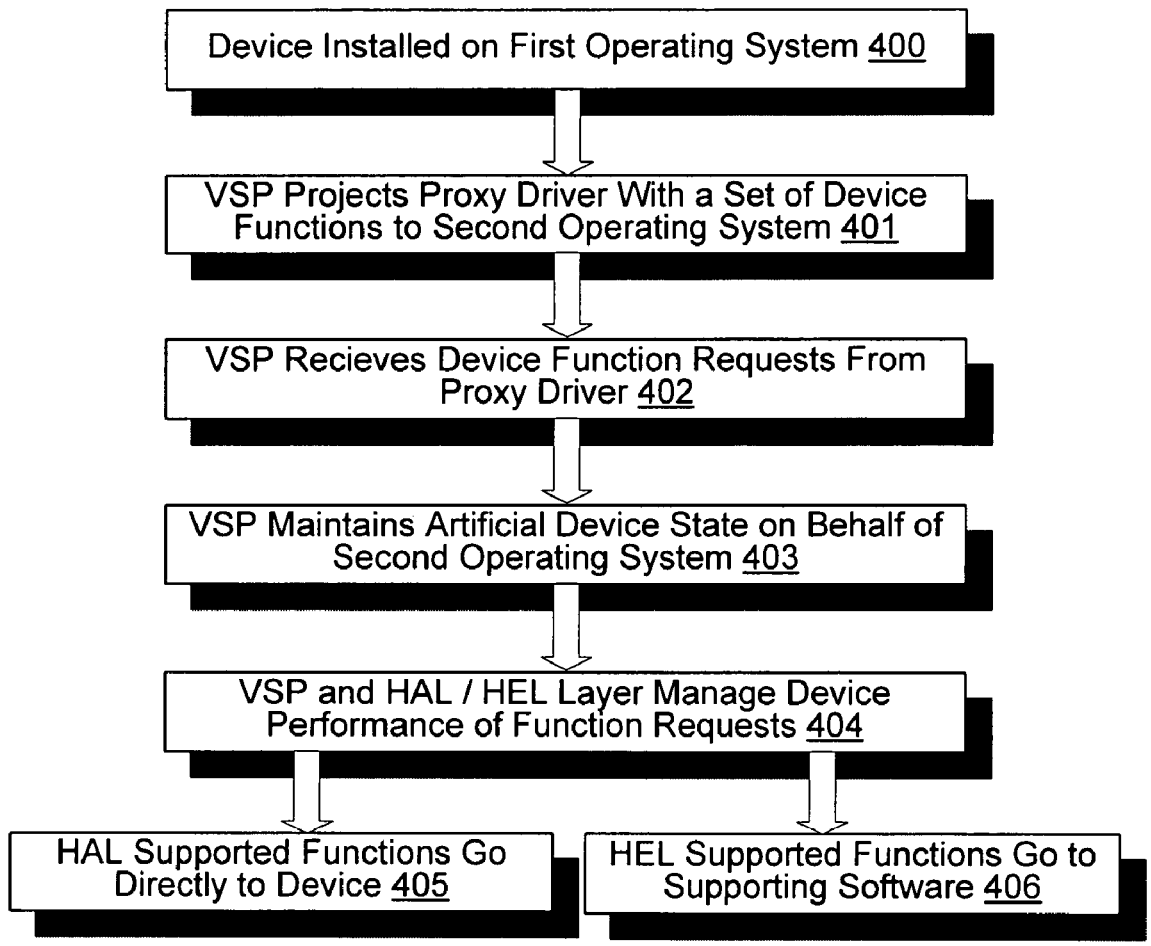
FIG. 4 is a flow diagram indicating an exemplary sequence of actions in providing a set of device functions to a guest operating system and carrying out at least one device function on behalf of a guest.

FIG. 4 is a flow diagram indicating an exemplary sequence of actions in providing a set of device functions to a guest operating system and carrying out at least one device function on behalf of a guest. FIG. 4 can be examined in combination with FIG. 3 for an illustration of the operation of a system such as that in FIG. 3.

First, a device may be installed on a host 400. The installation will configure the host's device drivers for proper operation of the device. Thus, the appropriate device driver(s) will be installed. The host will be able to maintain an actual device state, in addition to any artificial device states that are maintained on behalf of guest operating systems.

Next, a VSP may project a VDP with a set of device functions to a guest operating system 401. The precise function set, as explained above, may be determined by the VSP based on a number of factors. Next, upon use of the VDP by the guest, a function request may be received at the VSP 402. A function request can take a wide variety of forms. If the VDP does any processing prior to delivery of the function request, the function request may be distilled to an efficiently structured communication package. Otherwise, it may be simply the raw electronic signals intended to cause a device to carry out a function. These signals may be interpreted by the VSP to determine what function(s) have been requested by the guest.

An artificial device state may be maintained by a VSP on behalf of the guest 403. The guest is shielded from the actual device state, which allows device sharing by multiple operating systems that typically assume exclusive device control. Where a guest is insulated from actual device state, it may be prevented from interfering with the use of the device by other operating systems.

The VSP, in conjunction with the HAL/HEL layer and the other components of the first operating system's device stack, can manage device performance of the function requests 404. Thus, the requests may be scheduled in a queue that accounts for requests from other operating systems. Requests may be carried out by a combination of a device and emulation software. Requests may also be carried out by devices other than the guest's "intended" device—the VSP may use multiple devices to carry out a request. The function request may in fact not be carried out at all, while representing to the guest that it was in fact carried out. These are some examples that demonstrate the flexibility that is achieved in device usage by the systems and methods provided here.

Finally, functions that are supported directly by device hardware can be delivered more or less directly to the hardware for execution 405, while functions that require emulation can be executed by a combination of software and hardware 406.

Figure 5:
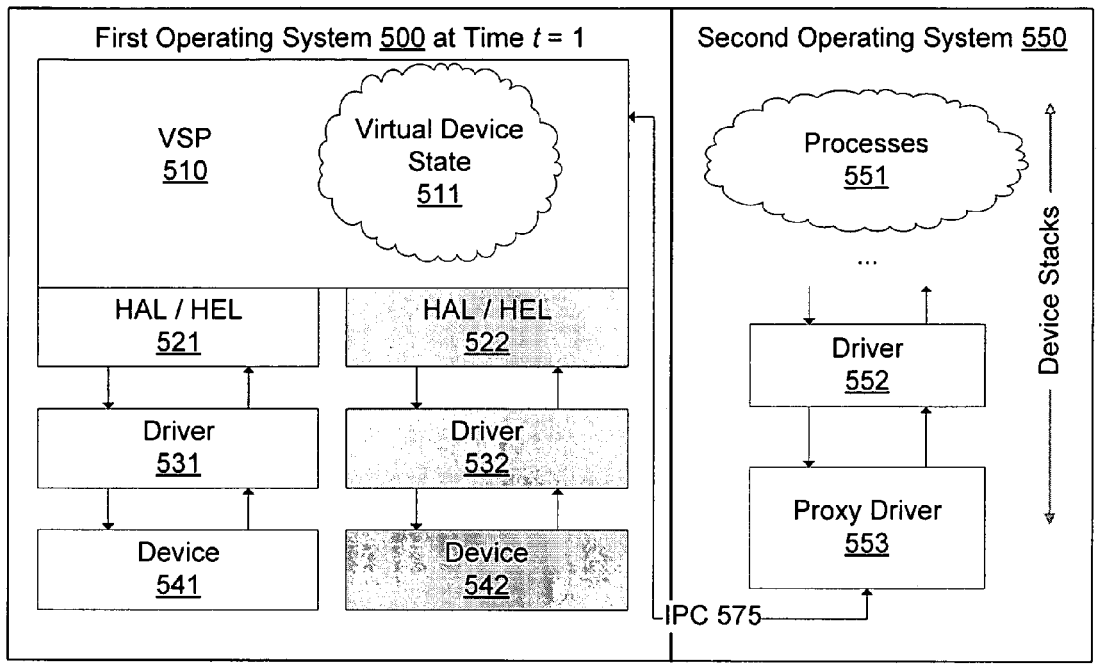
FIG. 5 illustrates a first operating system 500 at time t=1 that has ownership of both a first device 541, and a second, backup device 542. Function requests from the guest operating system 550 can be carried out by the first device 541.
Figure 6:
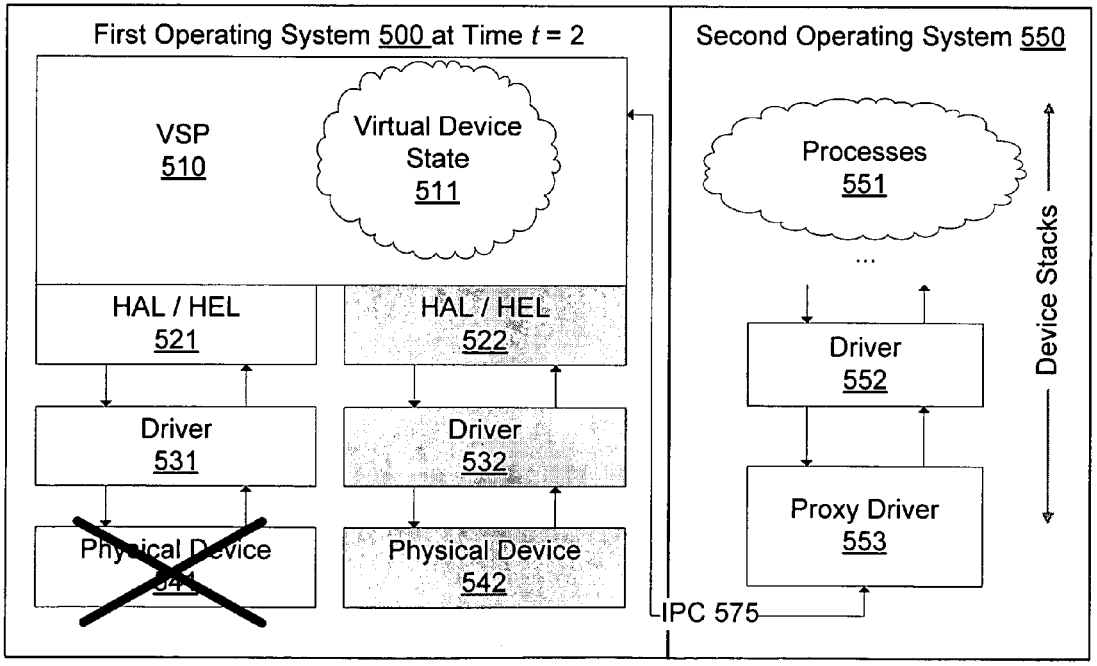
FIG. 6 illustrates the first operating system 500 from FIG. 5 at time t=2, when the first device 541 becomes unavailable. The unavailability of the device 541 need not be communicated to the guest 550.
Figure 7:
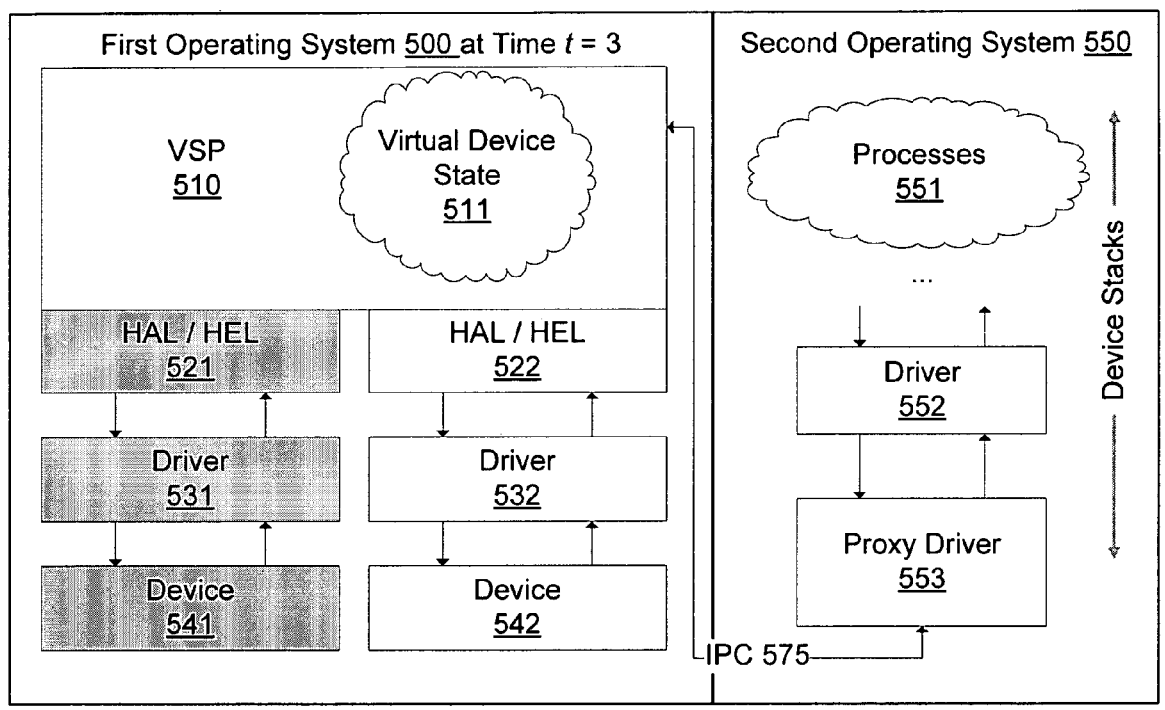
FIG. 7 illustrates the host operating system 500 from FIG. 5 at time t=3, when the host 500 switches from first device 541 to second device 542. Device 542 may require switching to a different HAL/HEL balance, as second device 542 may directly support more or less functions than first device 541 supported. The same set of functions may continue to be provided to the guest 550, and the device state 511 maintained on behalf of the guest 550 need not change.

FIG. 5, FIG. 6, and FIG. 7 illustrate a first operating system 500 at three different points in time. At time t=1, as illustrated in FIG. 5, a first device 541 is in use by operating system 500. At time t=2, as illustrated in FIG. 6, the first device 541 becomes unavailable. At time t=3, as illustrated in FIG. 7, operating system 500 begins using a second device 542 instead of the first device 541.

Figure 8:
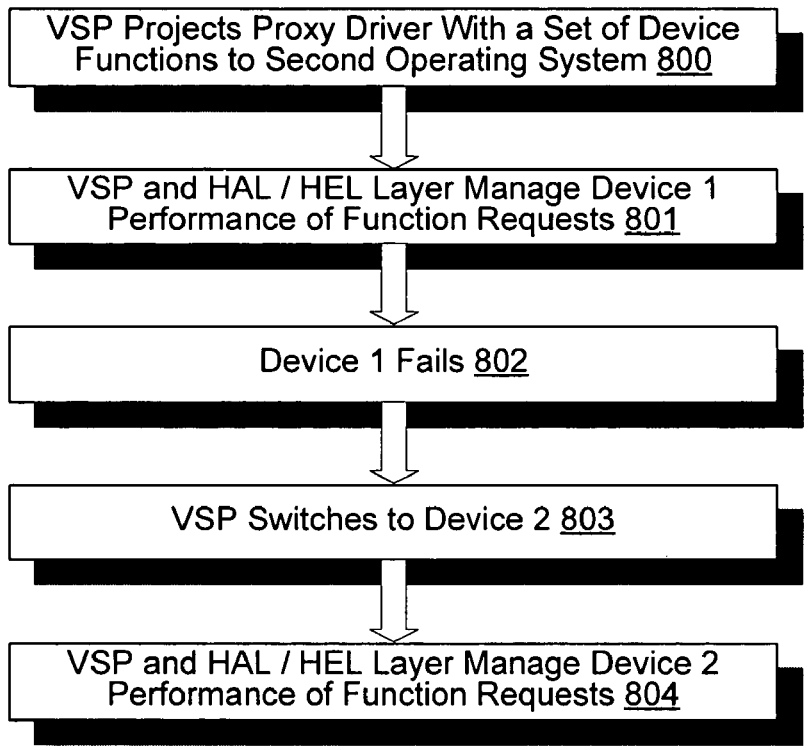
FIG. 8 is a flow diagram representing a sequence of occurrences that can be understood with reference to FIGS. 5-7, in which a device fails and a host operating system switches to the use of a backup device.
Figure 9:
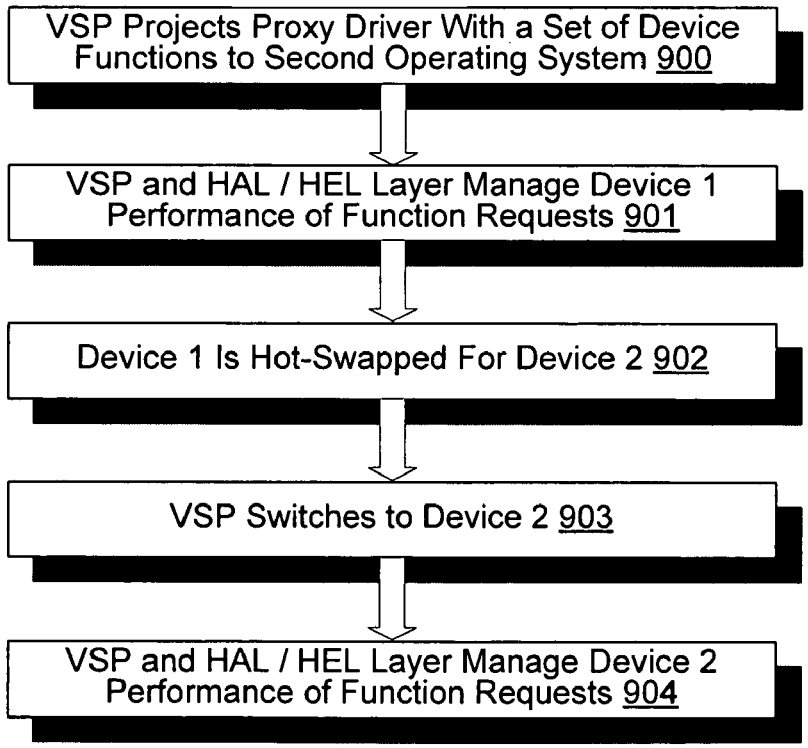
FIG. 9 is a flow diagram representing a sequence of occurrences that can be understood with reference to FIGS. 5-7, in which a device is swapped for another device and a host operating system switches to the use of a second device.

FIG. 5, FIG. 6, and FIG. 7 can be used to illustrate several advantages of the invention. Two scenarios in which the advantages are readily apparent are illustrated in FIG. 8 and FIG. 9. FIG. 8 illustrates a sequence of events in which a first device fails and a backup device is available. FIG. 9 illustrates a sequence of events in which a first device is hot-swapped for a second device. The following brief description will specifically describe FIG. 8 and FIG. 9 in the context of FIG. 5, FIG. 6, and FIG. 7.

In a first example, as provided by FIG. 8, a computer may have a first device and a second, backup device for use if the first device fails. A guest operating system can continue seamless operations while the first operating system manages the switch from a failed device to a backup. When a device fails, and a redundant device is waiting in reserve, it is desirable to have the reserve device seamlessly assume the responsibility of the failed device.

A VSP can isolate a device state on behalf of a proxy driver. Since the physical device state and capabilities have been abstracted by the VSP, it is possible to switch to the reserve device without interrupting the guest. The VSP queries the capabilities of the reserve device and initializes its state to match that of the failed device. The VSP then resumes operation using the reserve device. This operation is possible even if the capabilities of the failed device are different from that of the failed device because the superset of all capabilities of the device class can be defined by the HAL/HEL layer.

In this regard, a VSP projects a proxy driver with a set of device functions to a guest 800. Referring to FIG. 5, first operating system 500 at time t=1 contains VSP 510, which projects VDP 553 to guest 550 over IPC 575. The VDP 553 becomes available for guest 550 to operate using its device drivers, as represented by 551 and 552.

Next, in FIG. 8, a VSP in combination with a HAL/HEL layer manage performance of function requests 801. This represents normal operation of the first device. Referring to FIG. 5, function requests from guest 550 are delivered to VSP 510 via VDP 553. VSP 510 shepards some function requests through the HAL portion of 521, then to driver 531 and device 541. Other function requests can be accommodated via the HEL portion of 521, prior to operation of driver 531 and device 541. Backup device 542 and associated backup device drivers are available, but not used at this time.

Next, in FIG. 8, device 1 fails 802, and the VSP switches to device 2 803. Referring now to FIG. 6, the large black "x" over device 541 represents failure of that device. Prior to failure, VSP 510 may have been maintaining a device state 511 on behalf of guest 550. This device state 511 can remain unchanged while VSP 510 manages the switch from the use of device 541 to device 542. To accomplish the switch, the VSP 510 can query the capabilities of the reserve device 542 and initialize its state to match that of the failed device. The VSP 510 may then resume operation using the reserve device 542. Notably, the guest 550 need not be notified that the failure occurred. Moreover, guest 550 need not have any of the necessary logic to manage such a switch or to operate backup device 542.

Next, in FIG. 8, a VSP in combination with a HAL/HEL layer manage a second device's performance of function requests 801. Referring to FIG. 7, once the switch from device 541 to device 542 is accomplished, any function requests awaiting performance by device 541 can be carried out by device 542, resulting in a seamless experience from the perspective of guest 550. The VSP 510 may have to readjust a HAL/HEL 522 balance to account for differences in the functions supported by device 541 and device 542. New device drivers 532 may be used to deliver low-level instructions to a device 542.

An example of the operation described above with reference to FIG. 8 is as follows: A host could be configured with two physical network adapters; one active and one in reserve. When the VSP detects problems with the active adapter, it can use the technique described above to switch to the reserve adapter. The capabilities of the two adapters do not need to be the same. The reserve adapter could be, for example, a lower cost alternative to the primary adapter.

In a second situation, as provided by FIG. 9, devices may be hot-swapped on a host operating system that supports hot-swap operations, even where one or more guest operating systems do not support hot-swapping. Examples of hot-swapping are operations according to the Advanced Configuration and Power Interface (ACPI) or Standard Hot Plug Configuration (SHPC) PCI standards. It is advantageous to support hot-swapping devices on host operating systems that support it while hosting guest operating systems that do not.

In the configuration demonstrated in FIG. 5, FIG. 6, and FIG. 7, host side hot-plug events can be noted by the VSP 510, and concealed from the guest 550. Changes in device capabilities potentially alter the HAL/HEL balance in the relationship between the VSP 510 and the swapped device. The guest 550 benefits from any improved capabilities of the swapped device without service interruption, similar to the device failover scenario described above. This occurs even when the guest operating system 550 does not support hot-swapping of devices.

Thus, in FIG. 9, a VSP projects a proxy driver with a set of device function to a guest 900. Referring to FIG. 5, host 500 at time t=1 contains VSP 510, which projects VDP 553 to guest 550 over IPC 575. The VDP 553 becomes available for guest 550 to operate using its device stacks, as represented by 551 and 552. When referring to FIG. 5, FIG. 6, and FIG. 7 in the hot-swap context, the grey boxes 522, 532, 542 represent a device stack that is not in use because device 542 has not yet become available.

Next, in FIG. 9, a VSP in combination with a HAL/HEL layer manage performance of function requests 901. Referring to FIG. 5, just as with the failover situation of FIG. 8, this represents normal operation of the first device.

Next, in FIG. 9, device 1 is hot-swapped for device 2 902, and the VSP switches to device 2 903. Referring to FIG. 6, in the context of a hot-swap, device 541 has become unavailable and device 542 is now available. A host side hot-plug event has occurred. Referring to FIG. 7, this event can be noted by the VSP 510, and concealed from the guest 550. The artificial device state 511 can remain unchanged. In addition, different capabilities of device 542 potentially alter the HAL/HEL 522 balance in the relationship between the VSP 510 and the swapped device 542. The VSP 510 can adjust to a new HAL/HEL balance 542. The guest 550 benefits from any improved capabilities of the swapped device 542 without service interruption even though the guest 550 does not support hot-swapping of devices.

Figure 10:
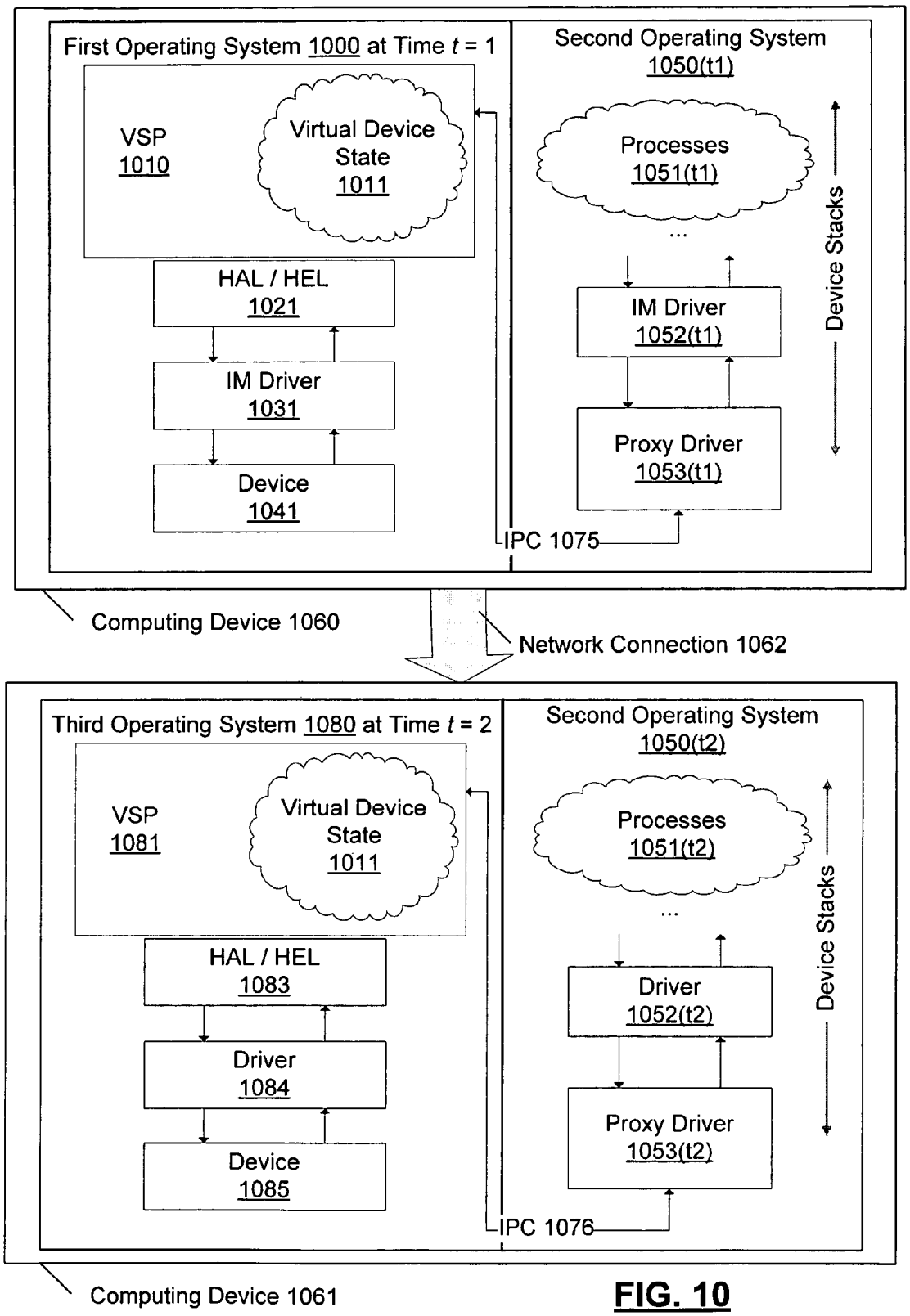
FIG. 10 is a state diagram illustrating the migration of a guest operating system 1050 from a first host 1000 to a second host 1080. The top portion of the Figure illustrates time t=1, prior to migration, and the bottom portion illustrates time t=2, after migration. Host 1000 and host 1080 can both project the same set of device functions into operating system 1080, allowing for seamless migration.

FIG. 10 is a state diagram illustrating the migration of an operating system 1050 from a first host 1000 to a second host 1080. The top portion of FIG. 10 illustrates time t=1, prior to migration, and the bottom portion illustrates time t=2, after migration. Host 1000 and host 1080 can both project the same set of device functions into guest 1050, allowing for seamless migration. Thus, the use of a Virtual Device Proxy (VDP) 1053 can assist in virtual machine 1050 migration.

FIG. 10 provides two computing devices 1060 and 1061, each with a host operating system 1000 and 1080, respectively. The computing devices 1060 and 1061 can communicate across a network connection 1062. The guest 1050(t1) resides at the first computing device 1060 at time t1, and migrates to the second computing device 1061, where the same guest 1050(t2) resides at time t2. The guest 1050 may comprise device drivers, e.g., 1052, and any processes 1051 running on guest 1050. A VDP 1053(t1) can be projected via IPC 1075 by host 1000 at time t1, and after migration an identical or substantially similar VDP 1053(t2) can be projected via IPC 1076 by host 1080.

Device state 1011 can be migrated from VSP 1010 to VSP 1081. VSP 1081 can continue to carry out device function requests where VSP 1010 left off, and to maintain an appropriate artificial device state 1011 on behalf of the second operating system 1050(t2). This is true whether or not device 1085 has the same capabilities as device 1041. If device 1085 has different capabilities that device 1041, then VSP 1081 will strike a different HAL/HEL 1083 balance than the HAL/HEL 1021 balance struck by VSP 1010.

In contrast, migration of a virtual machine can be problematic without the techniques provided here if the hardware in the destination host does not closely match the hardware in source host. Virtual machines, whether in saved state or during a live migration, contain instantiated device stacks for the specific devices projected by the originating host.

The configuration of FIG. 10 resolves this difficulty because the VSP 1010 can support a known set of capabilities in the HAL/HEL layer 1021 for a particular device class, e.g., the class of devices corresponding to device 1041. Whether that support is achieved in hardware or through emulation in software via the HEL portion of 1021 need not affect the behavior of the proxy device 1053 in guest 1050.

For example, a virtual machine 1050(t1) configured with a network adapter proxy driver 1053(t1) that exposes support for TCP offloading (TOE) would have a data path that bypasses the framing layer, which ultimately will be provided by the physical adapter 1041. If that virtual machine 1050(t1) migrated to a host 1080 with an adapter 1085 that did not support TOE, the device stack in the virtual machine 1050(t2) would be invalid. Use of a virtual device proxy 1053(t2) that always supports TOE, either directly through hardware abstraction or indirectly through hardware emulation, solve this particular migration issue by allowing the device stack in 1050(t2) to resume without being torn down and rebuilt.

Figure 11:
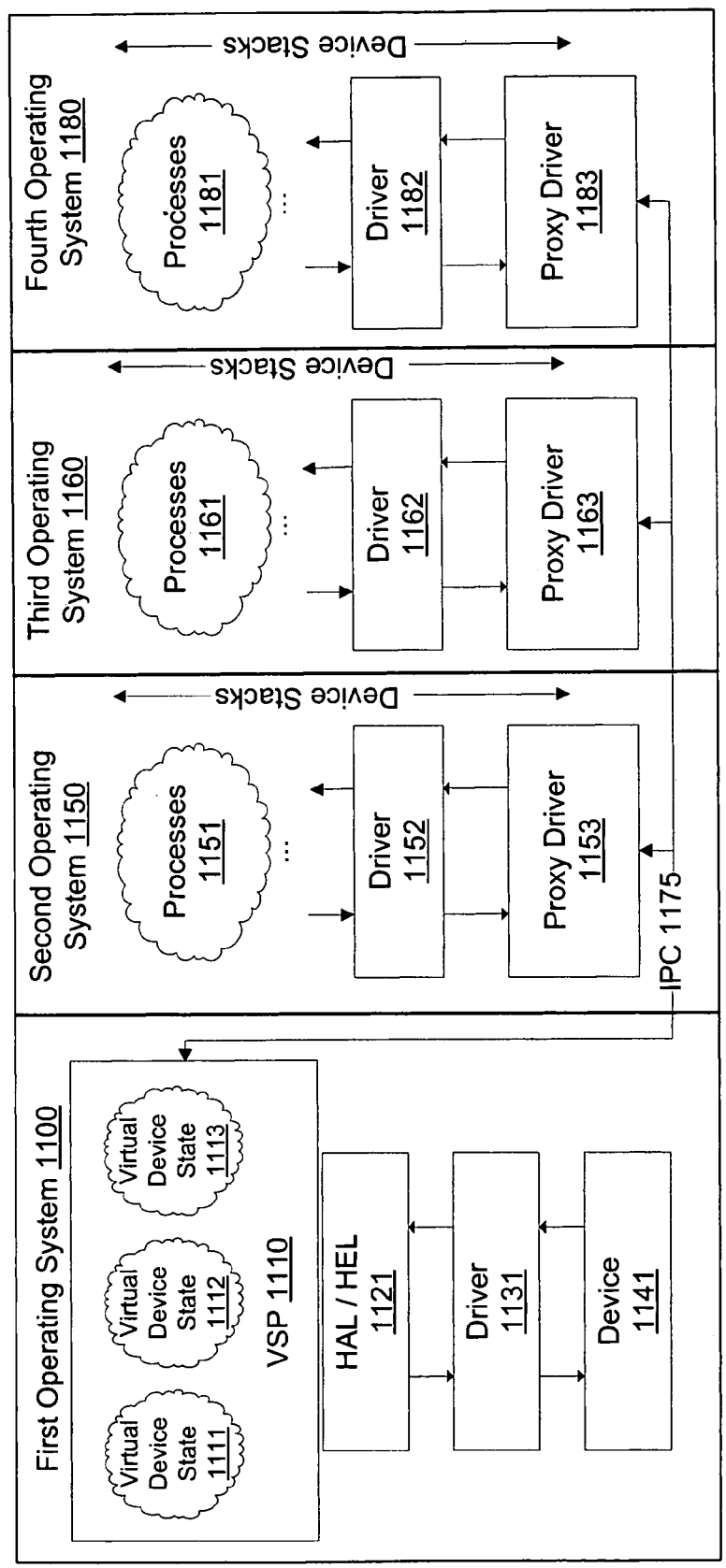
FIG. 11 is a state diagram illustrating management of device 1141 access between multiple operating systems, e.g., 1100, 1150, 1160, and 1080. Multiple device states 1111, 1112, 1113 can be maintained on behalf of the operating systems that request device functions. Performance of the functions by device 1141 can also be managed.

FIG. 11 is a state diagram illustrating management of device 1141 access between multiple operating systems, e.g., 1100, 1150, 1160, and 1080. Multiple device states 1111, 1112, and 1113 can be maintained on behalf of the operating systems 1050, 1060, 1080 that request device 1141 functions. Performance of the functions by device 1141 can also be managed.

When managing a physical device 1141, device architectures of operating systems such as 1050, 1060, and 1080 comprising drivers 1151 and 1152, 1161 and 1162, and 1181 and 1182, respectively, may be built with the assumption that there is a single instance of the system 1050, 1060, or 1080, and that instance is the mediator of all other entities 1050, 1060, or 1080 accessing the device 1141. This is not the case in a virtual machine environment when a physical device 1141 is shared across multiple operating systems 1100, 1050, 1060, and 1080. The operating system 1100 that owns the device 1141 can mediate access to the device 1141 between multiple guest operating systems, e.g., 1050, 1060, and 1080 that may assume they have exclusive ownership of the device 1141.

Use of a device proxy 1153, 1163, 1183, where the device state(s) 1111, 1112, 1113 are consolidated in a single VSP 1110, allows the VSP 1110 to mediate access to the device 1041 between multiple operating systems 1050, 1060, and 1080. For example, multiple virtual machines 1050, 1060, and 1080 could be configured to use the same USB card reader 1041. The state of the reader 1111, 1112, 1113, in the context of all guests 1050, 1060, and 1080 can be mediated by the VSP 1110 using a HAL/HEL balance 1121 that is appropriate for the device 1041.

It should be emphasized that the invention may be implemented in connection with any computing environment, such as in a single computer, in a large and complex network, or in a distributed computing environment. Still further, the present invention may be implemented in or across a plurality of processing chips or devices, and storage may similarly be effected across a plurality of devices. Such devices might include personal computers, network servers, database servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A computer system comprising:
    computer hardware configured to execute a first operating system, the computer hardware comprising a hardware device;
    a virtual machine configured to execute a second operating system;
    the hardware device being configured to be controlled by said first operating system via a driver installed on said first operating system;
    the first operating system including a service provider, said service provider configured to:
    determine a set of functions to expose to the second operating system, the set of functions including functions that the hardware device is configured to perform and functions that software is configured to emulate,
    expose the set of determined functions to the second operating system via a proxy driver instantiated in the second operating system, the service provider configured to receive function invocations from the second operating system via the proxy driver and send function invocations that are directly supported by said hardware device to the hardware device and function invocations that software is configured to emulate to an emulator.

2. The computer system of claim 1, further comprising a hardware abstraction and emulation layer between said service provider and said driver installed on said first operating system, wherein the hardware abstraction and emulation layer provides a first plurality of functions that are directly supported by the hardware device, and a second plurality of functions that require execution of software to carry out substantial aspects of a corresponding request.

3. The computer system of claim 1 wherein said proxy driver is configured by said service provider to represent said at least one function of said hardware device to a plurality of operating systems.

4. The computer system of claim 1 wherein the service provider maintains an artificial device state of the hardware device on behalf of the second operating system.

5. The computer system of claim 1 wherein the service provider comprises a component for determining if the hardware device is exchanged for a second hardware device.

6. The computer system of claim 1, further comprising a network connection to a second computer system, wherein said second operating system is configured to be migrated across said network connection to said second computer system while maintaining a set of driver commands at said first operating system on behalf of said second operating system.

7. A computer readable storage medium having instructions for representing by a first operating system a hardware device in a second operating system, said instructions comprising:

instructions for a first operating system that includes a service provider, the service provider including instructions for:

determining a set of functions to expose to a second operating system executing in a virtual machine, the set of functions including functions that a hardware device is configured to perform and functions that software is configured to emulate, the hardware device being controlled from the first operating system via a driver installed in the first operating system;

exposing the set of determined functions to the second operating system via a proxy driver instantiated in the second operating system, the service provider configured to receive function invocations from the second operating system via the proxy driver and sending function invocations that are directly supported by said hardware device to the hardware device and function invocations that software is configured to emulate to an emulator.

8. The computer readable storage medium of claim 7 wherein said instructions for sending function invocations that are directly supported by said hardware device and function invocations that are emulated by software to an emulator comprise instructions for requesting a hardware abstraction and emulation layer to perform the function invocations, wherein the hardware abstraction and emulation layer provides a first plurality of functions that are directly supported by the hardware device, and a second plurality of functions that require execution of software to carry out substantial aspects of a corresponding request.

9. The computer readable storage medium of claim 7, further comprising instructions for configuring by said first operating system said proxy driver to represent said at least one function of said hardware device to a plurality of operating systems.

10. The computer readable storage medium of claim 7, further comprising instructions for maintaining by said first operating system an artificial device state of the hardware device on behalf of the second operating system.

11. The computer readable storage medium of claim 7, further comprising instructions for determining if the hardware device is exchanged for a second hardware device.

12. The computer readable storage medium of claim 7 wherein said instructions for communicating remain operable when said second operating system is migrated from a first computer system to a second computer system.

13. The computer readable storage medium of claim 7, further comprising instructions for switching by said first operating system from the use of said hardware device to the use of a second hardware device.

14. A method for representing by a first operating system a hardware device in a second operating system, comprising:

determining, by a service provider executing within said first operating system, a set of functions to expose to a second operating system executing in a virtual machine, the set of functions including functions that a hardware device is configured to perform and functions that software is configured to emulate, the hardware device being controlled from the first operating system via a driver installed in the first operating system;

configuring by said first operating system a proxy driver to expose said set of functions to said second operating system;

exposing the set of determined functions to the second operating system via a proxy driver instantiated in the second operating system, the service provider configured to receive function invocations from the second operating system via the proxy driver and sending function invocations that are directly supported by said hardware device to the hardware device and function invocations that software is configured to emulate to an emulator.

15. The method of claim 14 wherein said sending function invocations that are directly supported by said hardware device and function invocations that are emulated by software to an emulator comprises requesting a hardware abstraction and emulation layer to perform the function invocations, wherein the hardware abstraction and emulation layer provides a first plurality of functions that are directly supported by the hardware device, and a second plurality of functions that require execution of software to carry out substantial aspects of a corresponding request.

16. The method of claim 14, further comprising configuring by said first operating system said proxy driver to represent said at least one function of said hardware device to a plurality of operating systems.

17. The method of claim 14, further comprising maintaining by said first operating system an artificial device state of the hardware device on behalf of the second operating system.

18. The method of claim 14, further comprising determining if the hardware device is exchanged for a second hardware device.

19. The method of claim 14 wherein said communicating occurs despite a concurrent migration of said second operating system from a first computer system to a second computer system.

20. The method of claim 14, further comprising switching by said first operating system from using said hardware device to using a second hardware device.

* * * * *